(12) United States Patent
Jørn et al.

(10) Patent No.: US 6,962,678 B2
(45) Date of Patent: Nov. 8, 2005

(54) REACTOR FOR CARRYING OUT NON-ADIABATIC REACTIONS

(75) Inventors: Ernst Jørn, Kgs. Lyngby (DK); Erik Løgsted-Nielsen, Copenhagen NV (DK)

(73) Assignee: Haldor Topsoe A/S, Lyngby (DK)

(*) Notice: Subject to any disclaimer, the term of this patent is extended or adjusted under 35 U.S.C. 154(b) by 526 days.

(21) Appl. No.: 09/997,898

(22) Filed: Nov. 30, 2001

(65) Prior Publication Data

US 2002/0064488 A1 May 30, 2002

(30) Foreign Application Priority Data

Nov. 28, 2000 (DK) .......................................... 2000 01789

(51) Int. Cl.[7] .............................. F28D 7/00; B01J 8/04
(52) U.S. Cl. ........................ 422/198; 422/199; 422/200; 422/188
(58) Field of Search ................................ 422/188, 191, 422/193, 196, 198–205

(56) References Cited

U.S. PATENT DOCUMENTS

| | | | |
|---|---|---|---|
| 4,071,324 A | | 1/1978 | Reid |
| 4,430,304 A | * | 2/1984 | Spurrier et al. ............. 422/204 |
| 4,973,777 A | * | 11/1990 | Alagy et al. ................. 585/403 |
| 5,070,694 A | | 12/1991 | Whittenberger |
| 5,456,889 A | | 10/1995 | Pow et al. |
| 5,456,890 A | | 10/1995 | Tsai et al. |
| 5,853,674 A | | 12/1998 | Lesieur |
| 5,958,091 A | | 9/1999 | Sakai et al. |
| 6,109,018 A | | 8/2000 | Rostrup-Nielsen et al. |
| 6,180,081 B1 | * | 1/2001 | Poschmann et al. ..... 423/648.1 |
| 6,284,206 B1 | * | 9/2001 | Lesieur et al. .............. 422/198 |

FOREIGN PATENT DOCUMENTS

| | | |
|---|---|---|
| EP | 0 945 174 A | 9/1999 |
| WO | WO 98/50147 | 11/1998 |
| WO | WO 98/50147 A1 * | 11/1998 ............ B01J/19/00 |

* cited by examiner

Primary Examiner—Kevin P. Kerns
(74) Attorney, Agent, or Firm—Dickstein Shapiro Morin & Oshinsky LLP

(57) ABSTRACT

A reactor for carrying out endothermic catalytic reaction is provided. The reactor features a metallic ingot with at least one tubular reaction passage extending through the ingot. The reaction passage is adapted to hold a catalyst for endothermic conversion of a feedstock. Provided are inlet passages for introduction of the feedstock into the reaction passage, and outlet passages for withdrawing feedstock. The inlet and outlet passages are provided within the ingot. An electrical heater supplies to the ingot and the reaction passage the heat for the catalytic endothermic conversion of the feedstock.

18 Claims, 1 Drawing Sheet

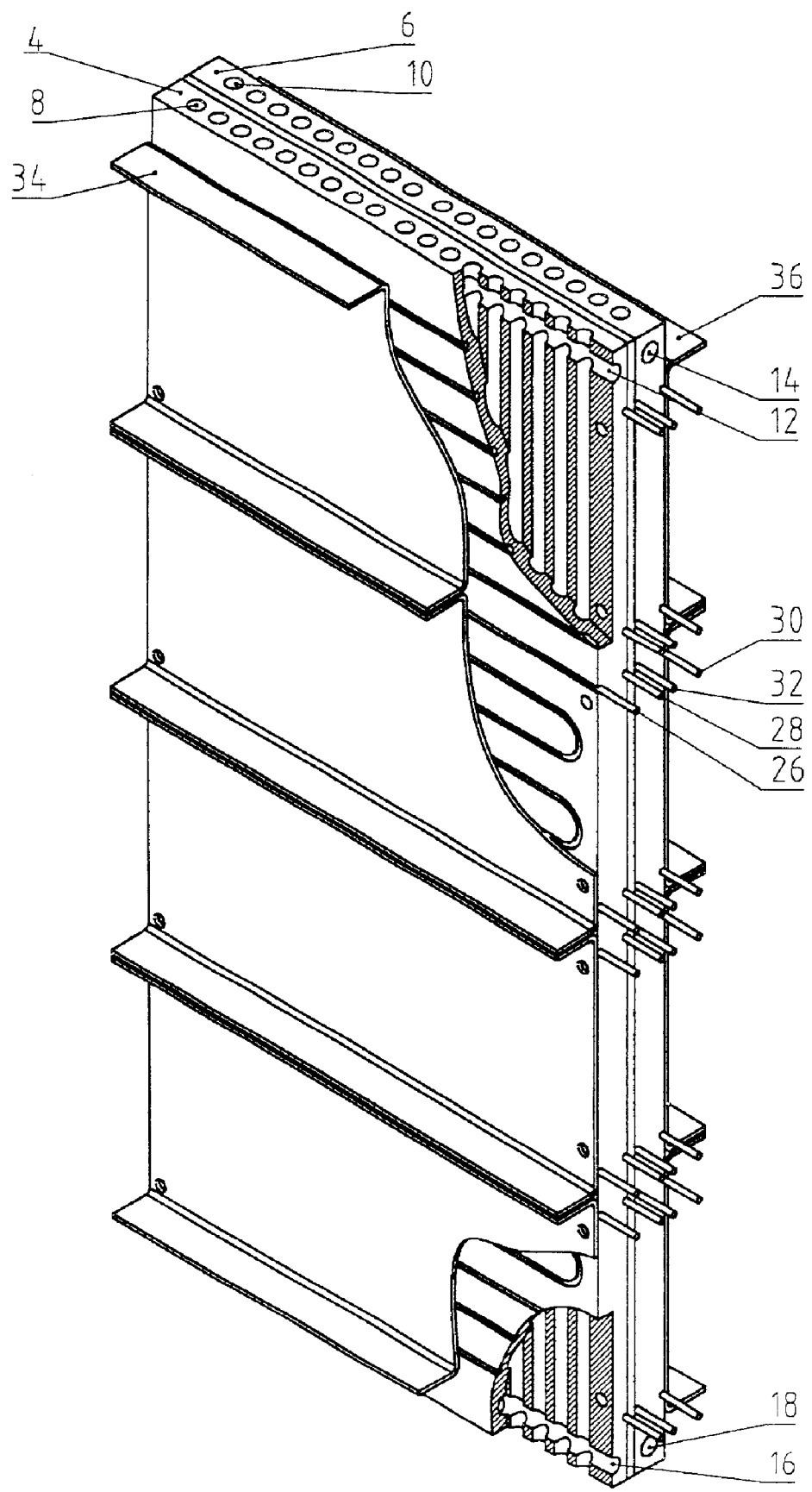

REACTOR FOR CARRYING OUT NON-ADIABATIC REACTIONS

BACKGROUND OF THE INVENTION

The present invention relates to a reactor for carrying out non-adiabatic reactions in general. More particularly, the invention provides a reaction system for use in the conversion of a feedstock by endothermic or exothermic reactions especially in small-scale industrial applications and for installation in vehicles.

Endothermic or exothermic reactions require constant supply or removal of heat for maintaining reasonable reaction rates. Heat is in industrial reactors for carrying out those reactions usually transferred by convection or radiation from a heat conducting medium. During endothermic reactions, necessary heat is usually supplied indirectly by hot flue gas obtained by combustion of fuel. Cooling of exothermic reactions is typically performed indirectly by heat exchange with a hot fluid or directly through addition of cold quenches gases.

In small sized chemical plants and in mobile use of endothermic reactors, combustion of fuel is in general a disadvantage due to environmental and safety regulations requiring emission purification and expensive measures to prevent danger of fire.

The general object of this invention is thus to provide a reactor or reaction system for use in the above mentioned small size applications being carried out in a compact reactor. Heat is supplied or removed by means of indirect heat conduction with a heat-conducting medium or means such as oil, steam, by electrical heating means and cooling liquids.

The above heat conducting media and electrical heaters are conventionally employed in the heating of reactors in a laboratory or of bench-scale size.

It is further known to heat different catalyst structures electrically. Those methods are typically used in catalytic purification of automobile exhaust and for start-up procedures in catalytic converters (U.S. Pat. Nos. 5,070,694; 5,456,890 ; and 6,109,018.)

SUMMARY OF THE INVENTION

The reactor of this invention consists in its broadest aspect of a metallic ingot comprising at least one reaction passage extending through the ingot and being adapted to hold a catalyst for non-adiabatic conversion of a feedstock. Provided are inlet passages for introduction of the feedstock into the reaction passage and outlet passages for withdrawing reacted feedstock, the inlet and outlet passages being provided within the ingot. Also provided are means for heating or cooling the ingot and the reaction passage to maintain the catalytic non-adiabatic conversion of the feedstock.

Materials and dimension of the reactor and different passages will be selected in accordance with the intended application of the reactor. Convenient metallic materials are those that have proper heat conducting properties and are mechanically and chemically stable at operation conditions.

The reactor according to the invention is in particular useful in small sized applications as introductorily mentioned. Those applications include in particular preparation of hydrogen from methanol containing feed gas for use in fuel applications in vehicles or on board of ships.

A convenient method to construct the above reactor will be drilling one or more reaction passages through a metallic ingot or block. Typically, the reactor contains a number of reaction passages, wherein the passages are drilled in series of parallel rows through the ingot and supplied with the feedstock through drilled passages extending in a substantially perpendicular direction to the reaction passages and thereby being connected with the reaction passages in a parallel manner. Preferably, in a multi reaction passage reactor of the above type each row of reaction passages will be connected with an inlet passage at the inlet side of the reactor. In a similar manner, reacted feedstock is withdrawn from the reactor through outlet passages connecting with the reaction passages at the outlet end of the reactor and being drilled within the ingot in a substantially perpendicular direction to the reaction passages.

The entire ingot is heated or cooled by a heat conducting medium flowing in passages being embedded in the ingot, machined within the ingot structure or applied at the structure surface.

When employing the inventive reactor in praxis, catalyst is loaded into the reaction passages either in the form of particles or as a coating, film or paint on the inner wall of the reaction passages. The reaction passages are closed fluid tight at the top and bottom ends by conventional means prior to operation of the reactor.

BRIEF DESCRIPTION OF THE DRAWINGS

Construction and operation of the inventive reactor will be apparent in more detail from the following description by reference to the drawings in which the sole FIGURE shows a specific embodiment of the invention employed in endothermic conversion of a hydrocarbon feedstock.

DETAILED DESCRIPTION OF THE PREFERRED EMBODIMENT

A reactor 2 according to a specific embodiment of the invention consists of metallic blocks 4 and 6. Blocks 4 and 6 are provided with a series of parallel reaction channels 8 and 10 drilled through the blocks. Each series of channels is connected to main feed inlets 12 and 14 connecting each row of channels 8 and 10 in parallel.

Reacted feed is withdrawn from channels 8 and 10 through main outlets 16 and 18.

Each of blocks 4 and 6 is further provided with a number of electrical heating strips 26 and 28 within outer surfaces of block 4 and strips 30 and 32, within outer surface of block 6, or in grooves (not shown) in the surface. The blocks are collected within a common shell 34 provided with shelves 36 to support insulating material (not shown) at the outer surface of shell 34.

When employing the above described reactor in the preparation of hydrogen by catalytic cracking of alcohol, channels, shown as series of rows 8 and 10 in the FIGURE, are loaded with conventional cracking catalyst, e.g., in the form of particles.

Prior to loading the channels and operating the reactor, the open ends of the channels are sealed with plugs being welded or screwed into the open ends.

Alcohol containing feed gas is introduced into the reactor via main inlets 12 and 14 and distributed to channel rows 8 and 10.

Within the channels, the feed gas is converted to hydrogen rich process gas by known alcohol cracking reactions proceeding on conventional cracking catalyst (not shown). The produced process gas is finally withdrawn from the channels via the outlet passages as described above.

Necessary heat for the cracking reactions is supplied to the catalyst by heating the entire reactor 2 with heat being generated by the electrical heating strips.

What is claimed is:

1. Reactor for carrying out non-adiabatic catalytic reactions comprising:

a metallic ingot comprising one or more reaction passages extending through the ingot and adapted to hold a catalyst for non-adiabatic conversion of a feedstock;

inlet passages for introduction of the feedstock into the one or more reaction passages and outlet passages for withdrawing reacted feedstock, the inlet and outlet passages being provided within the ingot, and disposed substantially perpendicular to and located respectively toward opposing ends of, the one or more reaction passages; and heating or cooling means for maintaining the catalytic reactions within the one or more reaction passages.

2. The reactor of claim 1, wherein the one or more reaction passages are arranged in parallel rows within the ingot.

3. The reactor of claim 1, wherein the heating or cooling means is arranged within the ingot.

4. The reactor of claim 1, wherein the heating or cooling means is provided in a substantially perpendicular direction with the one or more reaction passages.

5. The reactor of claim 1, wherein the heating or cooling means is in the form of an electrical heater.

6. A reactor containing a plurality of the metallic ingots according to claim 1.

7. The reactor of claim 6, wherein the metallic ingots are arranged within a common shell.

8. The reactor of claim 7, wherein the common shell is heat insulated.

9. The reactor according to claim 1, wherein the one or more reaction passages and the outlet and inlet passages are in the form of drilled channels.

10. The reactor according to claim 2, wherein the one or more reaction passages and the outlet and inlet passages are in the form of drilled channels.

11. The reactor according to claim 3, wherein the one or more reaction passages and the outlet and inlet passages are in the form of drilled channels.

12. The reactor according to claim 4, wherein the one or more reaction passages and the outlet and inlet passages are in the form of drilled channels.

13. The reactor according to claim 5, wherein the one or more reaction passages and the outlet and inlet passages are in the form of drilled channels.

14. The reactor according to claim 6, wherein the one or more reaction passages and the outlet and inlet passages are in the form of drilled channels.

15. The reactor according to claim 7, wherein the one or more reaction passages and the outlet and inlet passages are in the form of drilled channels.

16. The reactor according to claim 8, wherein the one or more reaction passages and the outlet and inlet passages are in the form of drilled channels.

17. The reactor of claim 3, wherein the heating or cooling means is arranged at a surface of the ingot.

18. The reactor of claim 1, wherein the heating or cooling means is arranged at a surface of the ingot.

* * * * *